Jan. 12, 1965   A. W. HALLOCK ETAL   3,165,352
TELESCOPIC ROOF COVER CONSTRUCTION FOR AUTOMOTIVE VEHICLES
Filed Jan. 3, 1963   2 Sheets-Sheet 1

INVENTORS
ALBERT W. HALLOCK
GEORGE S. MISTLER
BY
ATTORNEY

Jan. 12, 1965   A. W. HALLOCK ETAL   3,165,352
TELESCOPIC ROOF COVER CONSTRUCTION FOR AUTOMOTIVE VEHICLES
Filed Jan. 3, 1963   2 Sheets-Sheet 2

INVENTORS
ALBERT W. HALLOCK
GEORGE S. MISTLER
BY
Joseph F. Padlon
ATTORNEY

United States Patent Office 3,165,352
Patented Jan. 12, 1965

3,165,352
TELESCOPIC ROOF COVER CONSTRUCTION FOR AUTOMOTIVE VEHICLES
Albert W. Hallock, 10 Pearl St., and George S. Mistler, 15 Woodland St., both of Bellport, N.Y.
Filed Jan. 3, 1963, Ser. No. 249,240
8 Claims. (Cl. 296—100)

This invention relates to a telescopic roof cover construction for automotive vehicles, such as pickup trucks, delivery wagons, station wagons and the like.

In many types of utility trucks or vehicles, the rear portion of the truck which carries loads of different items is usually left open and exposed to the weather, with the result that the items carried on the truck during bad weather, are exposed to such bad weather and may become spoiled or damaged due to such inclement weather. In many instances, such exposed portion of the truck is covered with tarpaulin or canvas. However, these tend to collect water from rain or snow forming puddles with the results that said such collected water seeps through the covering.

In the use of station wagons and the like, it is oftentimes desirable or necessary to have additional space or room for carrying items on the roof of the vehicle.

It is intended in accordance with the present invention, to provide a movable, collapsible multi-sectioned covering for the open part or top of the vehicle whereby the above disadvantages are prevented or avoided.

It is therefore an object of the present invention to provide a movable, multiple sectioned cover for an automotive vehicle, such cover having telescopic sections, whereby they may be readily moved toward the forward part of the vehicle and moved rearwardly to cover the vehicle or provide additional space protected from the elements.

It is another object of the present invention to provide a roof comprising telescopic sections made of any suitable type of weather resistant material, adapted to be slid along the length of the open or top part of the vehicle to cover the same, and being sufficiently rigid yet light in weight to facilitate their telescopic movement relatively one of the other during the use of the roof as such on the vehicle.

It is still another object of the present invention to provide an easily mounted construction for vehicles, having slidable, molded telescopic sections adapted for connection with the open or roof portion of the vehicle to cover the same.

A more specific object of the invention is to provide an easily mountable roof construction onto an automotive vehicle comprising a plurality of tight, form fitting telescopic sections which can be readily slid on tracks along the sides of the open, exposed part of the body of the vehicle to cover the same and protect the contents of the body of the vehicle from inclement weather.

Another specific object of the invention is to provide a roof construction comprising a multiplicity of telescopic sections adapted to fit and slide along the top sides of the vehicle and form an integral part thereof.

Other objects and features of the present invention will become apparent from the following description taken in conjunction with the attached drawings wherein.

Figure 1:
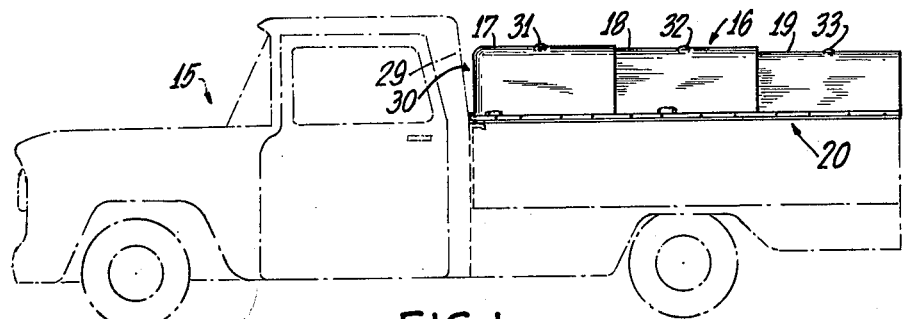
FIG. 1 is a side view of a pickup truck showing a preferred embodiment of the invention.

Referring now to the drawings wherein like numerals refer to like parts throughout, an automotive vehicle 15 as shown in outline form is provided with a covering construction 16 having a plurality of telescopic sections 17, 18 and 19, adapted to be mounted on rear open section 20 of said vehicle. The number of such sections, 17, 18 and 19, adapted to be mounted on rear opening on the size and length of the vehicle, it being understood that the number of sections shown and described herein are merely for purposes of illustration and not for restriction. Furthermore, said sections each have depending side walls 21 and 22 which will be further described in detail. Said sections are made of any suitable type of weather resistant material such as of thermally formed plastic or die formed aluminum plating.

Vehicle 15 is provided with opposed upright side walls 23 and 24 providing an open area 25 therebetween. On top of each of said side walls is mounted a track 26 and 27 which rest on base support members 26a and 27a respectively and continue forwardly of the wall and converge as a front accommodating section 28 set immediately behind the cab 29 and coextensive with the width between said walls 23 and 24.

Figure 2:
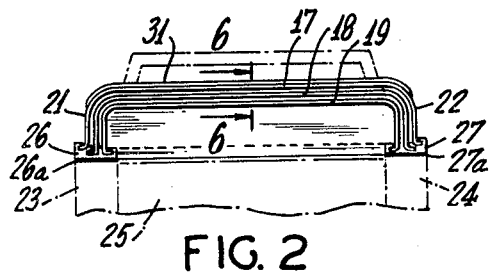
FIG. 2 is a rear view of FIG. 1 showing the rear ends of the cover sections.

The forward section 17 is so made that its front 30 adjacent the rear of cab 29 of the vehicle is closed thereby preventing the seepage or entrance of water or snow into the normally open area 25 of the vehicle. Also, it will be noted that sections 18 and 19 are of progressively and successively diminishing size as one goes to the rear of the vehicle, whereby one section can be telescoped into the other so as to form a compact unit, such as shown in FIG. 2 of the drawings. Said sections 17, 18 and 19 are each provided across their tops with beads or reinforcing ribs 31, 32 and 33, respectively. The beads extend the width of the tops of each section and then merge into the respective depending side walls as shown in FIG. 2.

Sections 17, 18 and 19 are of unitary construction being preferably initially cast, molded or extruded to assume the desired shape as shown in the drawings. The front section 17 is provided with a front wall 34 which merges with the side walls thereof so as to present a rounded contour. Further, the front wall is provided with a tongue 35 adapted to fit in cross groove 36 and be fixed therein in any suitable manner, not shown. In addition, section 17, at its free end 37, has a depression or concave peripheral portion 38 which is adapted to form contact with a peripheral convex end portion 39 on section 18 at its forward end to form a seal thereat. Also, said section 18 at its other end is provided with a peripheral concave portion 40 which in turn forms contact with a convex peripheral portion 41 extending at the forward free end 42 of section 19 forming a tight seal therewith when the sections are pulled away from each other as shown in FIG. 1 to form a tight fitting covering on the open area 25 of the vehicle.

Figure 3:
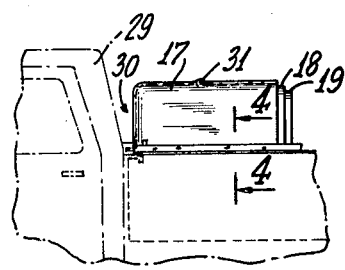
FIG. 3 is a fragmental side view of FIG. 1 showing the embodiment in telescoped condition.

It will be further noted that bead 32 of middle section 16 is so constructed that it readily clears the reverse bead or concave depression 38 when the sections are compressed together as shown in FIG. 3 of the drawings. The same feature is present with respect to section 19 in that its bead 33 readily clears reverse bead or concave depressions 40 of middle section 18.

Figure 6:
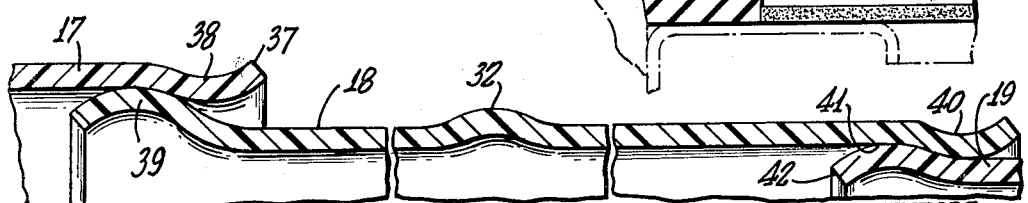
FIG. 6 is a longitudinal, fragmental sectional view taken on line 6—6 of FIG. 2.
Figure 7:
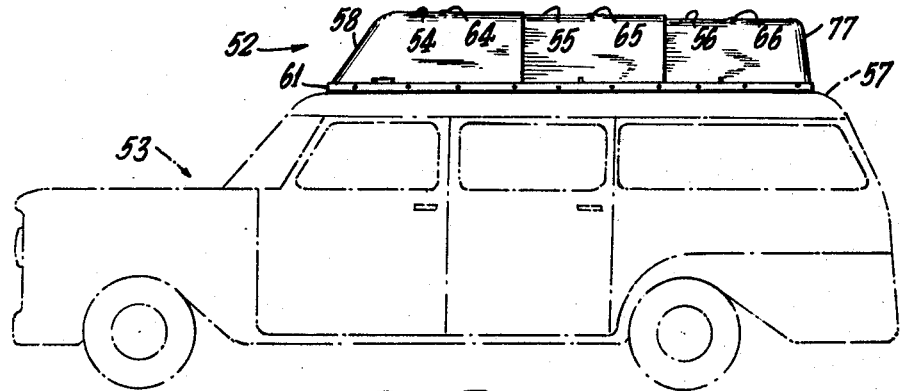
FIG. 7 is a side view of a station wagon showing another embodiment of the invention as mounted thereon.
Figure 8:
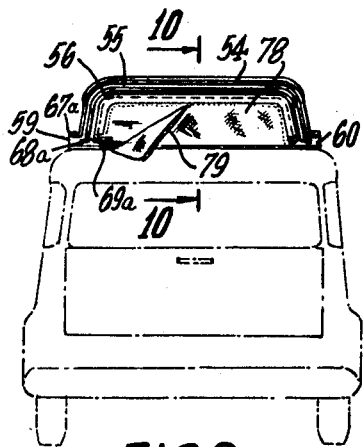
FIG. 8 is a rear end view of FIG. 7.

These beads readily permit easy sliding of the sections while at the same time prevent leakage of water therethrough into the interior open area 25 of the vehicle in that they form a seal as shown in FIG. 6 of the drawings.

Figure 4:
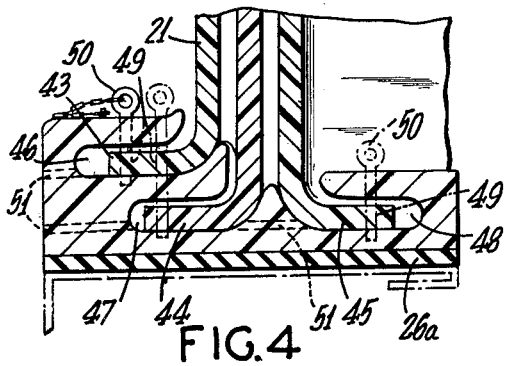
FIG. 4 is an enlarged sectional detail view taken on line 4—4 of FIG. 3.
Figure 5:
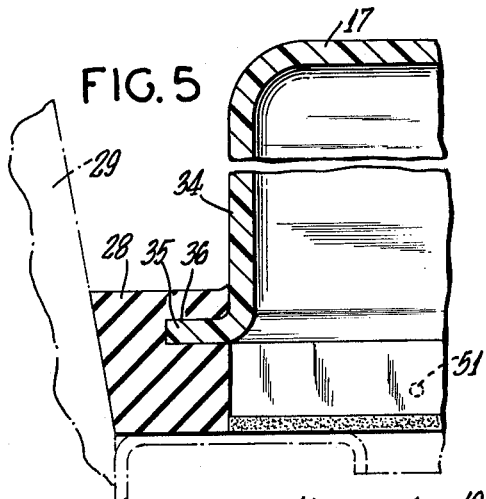
FIG. 5 is an enlarged fragmental detail view across the leading edge of the front portion of the embodiment shown in FIG. 1.

As previously described, each section has side depending walls 21 and 22, respectively, which terminate into flared end portions as shown more specifically in FIG. 4. The three side walls as shown therein have horizontal extensions 43, 44 and 45 respectively so as to rest in the respective horizontal channels or grooves 46, 47 and 48 respectively to permit easy sliding therein when the sections are moved. It is to be noted that the description of the extensions on walls 21 and the grooves is applicable to the construction on the other side wall and track 27.

Furthermore, said tracks 26 and 27 are provided with the respective extensions of the section and are provided with openings 49 to permit the insertion therein of fastening members 50 so as to immobilize the sections on the tracks. Said tracks are also provided with a plurality of drain ducts 51 to permit the outflow of any accumulated moisture or rain.

It is apparent from the foregoing that the sections 18 and 19 can be readily slid along their tracks to extend the same as roof or covering unit or when not in use to be in compacted condition shown in FIG. 3 whereas section 17 is fixed to the forward part of track 26 and 27. The tracks and sections being made of any suitable material are resistant to corrosion, oxidation, heat and cold, without their effectiveness being impaired. Also the sections being provided with reinforcing beads or ribs across their tops stiffen and strengthen the same against fracture when being used or when being spread or compacted as shown in the drawings.

Figure 9:
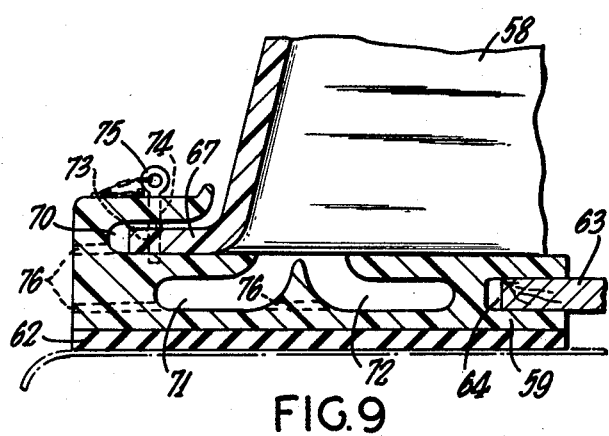
FIG. 9 is an enlarged fragmental view on fore and aft center line plane through leading edge of forward section.
Figure 10:
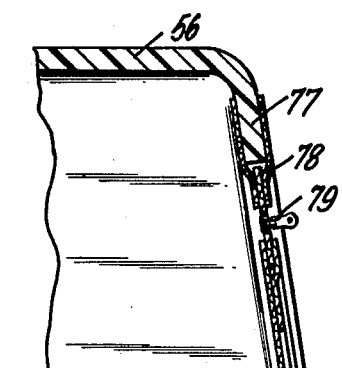
FIG. 10 is a fragmental enlarged sectional view of the rear end portion of the embodiment.

In the embodiment shown in FIGS. 7 to 10 inclusive it will be noted that the embodiment hereinabove described is used in modified form as 52 on the top of a station wagon 53 in which the telescopic sections 54, 55 and 56 are mounted on the roof 57 of the station wagon. The construction of each of said telescopic sections is substantially the same as the construction of the sections shown with respect to FIGS. 1 to 6 inclusive. However, the forward telescopic section 54 shown in FIG. 7 has a slanting front portion 58 so as to be symmetrical with the contour of the forward part of the station wagon. Each of said sections, 54, 55 and 56 as a unit is mounted on tracks 59 and 60 which are attached to the roof 57 of the vehicle. As previously indicated with respect to the embodiment in FIGS. 1 to 6 said tracks are adjacent the sides of the vehicle and they joint with a forward track portion 61. Also, said sections are provided with a base 62 as shown in FIGS. 9 and 10 which accommodate a floor 63. Said floor 63 is adapted to fit in grooves 64 of tracks 59 and 60 to provide proper resting place for luggage and the like without scratching the roof 57 of the vehicle.

It will be noted that sections 54, 55 and 56 are provided with reinforcing ribs or beads 64, 65 and 66, respectively to lend strength thereto. In addition, the depending walls 67 and 68, respectively of said sections have horizontal extensions 67a, 68a and 69a, respectively to fit in respective grooves 70, 71 and 72 in each track. Furthermore, said extensions and tracks are provided with openings 73 and 74, respectively, to accommodate fastening members 75. Said tracks are also provided with ducts or weep holes 76 extending from the grooves for the passage and drainage of water therefrom.

With respect to the end or rear section 56, it will be noted that the back 77 tapers down towards roof 57 and is provided with flexible canvas cover member 78 fixed thereto with a zipper device 79 which is used for closing of the open end of said section by means of said flexible cover 78. Upon operating the zipper peripherally around the end portion of said last section 77, said flexible cover then can be readily moved downwardly over the roof 57 so as to permit the insertion of various items to be covered in the telescopic sections as shown.

Roof constructions of the type shown and described herewith, can be made in any number of telescopic sections depending on the size of the vehicle on to which they are installed. The materials used can be readily adapted to the different format of section made, and are highly weather resistant. Also, such sections are easily moved and fastened, as required, to suit the specific occasion whether for commercial or pleasure vehicle of land or sea type and to protect the contents of the storage area from inclement weather or damage.

Furthermore, these sections can be readily telescoped and compacted so that the rear portion of the truck can be readily loaded. When not necessary, it may be left exposed to the atmosphere without fear of any damage to any of the material being delivered by the vehicle.

While the preferred embodiments of the invention have been disclosed, it is to be understood that modifications as to arrangement of parts, and use of material may be made without departing from the spirit and scope of the invention, as claimed herein.

What is claimed as new is:

1. For an automotive vehicle, an adjustable roof construction extending longitudinally on said vehicle comprising opposed tracks parallel to each other on said vehicle, a plurality of rearwardly and forwardly moving telescopic sections mounted on said tracks, the forward one of said sections being adapted to remain in firm relative position with respect to the other sections, the same being closed at three sides leaving an open, exposed end, said end having a beaded portion extending around the same, a proximate adjacent section having a top and side portion thereof with open ends and a beaded portion on each of said ends, the forward end of said section having a beaded portion exposed and adapted to contact the end portion of the forward section and form a closure therewith and an inwardly formed bead at the other rear end, and a continuing end section of smaller relative size than the previous sections, having an external bead at the forward open end and thereof adapted to contact the inwardly formed bead at the rear open end of the preceding section to form a closure therewith, closure means for said end section, said sections having terminal portions extending into the track means to permit sliding of the sections along said track, each of said tracks being mounted on the body of the vehicle in opposed parallel relation and having a plurality of laterally extending grooves therein to accommodate the terminal portion of the side walls of the sections to permit longitudinal sliding of the sections, said grooves being provided with drainage means.

2. A telescopic roof construction as set forth in claim 1, in which there are provided sealing means continuous with the track means adapted to act as seal for the forward part of the first section and be contiguous therewith.

3. The construction according to claim 1 wherein each of the sections is provided with intermediate beaded portions extending across the top thereof for stiffening of the same.

4. The construction according to claim 1 wherein the side walls of each of the sections is provided with terminal extensions extending into the tracks permitting relative adjustment of the sections on the vehicle.

5. The construction according to claim 1, wherein there are provided fastening means for each of the sections.

6. The construction according to claim 5 wherein there are provided closure means for the end section.

7. The combination according to claim 1 wherein the end section is provided with zippered movable closure means to permit opening of said end portion of the last section.

8. A telescoping roof for a vehicle comprising a roof construction adapted to fit over the major length of said vehicle, said roof comprising a plurality of movable, telescopic sections each of which has at least one reinforcing bead across the top thereof, and opposed side, portions integral with the top and having outwardly flared extensions, separately disposed tracks for each of said extensions mounted at the sides of the vehicle for accommodating said extensions, the foremost section having a closed interior portion merging with the top and sides of the section, each section having a terminal marginal bent edge portion at the top and sides whereby when the sections are drawn away from each other to cover the vehicle, the respective, bent marginal portions form a contact and seal of the respective contacting portions, means slidably fixing the sections to the tracks, water drainage means on said tracks, and closure means for the last section to cover the free end thereof.

References Cited by the Examiner
UNITED STATES PATENTS

| | | | |
|---|---|---|---|
| 2,074,358 | 3/37 | Bixel et al. | 296—100 |
| 2,481,868 | 9/49 | Philip | 296—137 |
| 2,853,340 | 9/58 | Hershberger | 296—137 |
| 2,970,642 | 2/61 | Parsons | 20—19 |
| 3,096,117 | 7/63 | Hallenbeck | 296—107 |

A. HARRY LEVY, *Primary Examiner.*